United States Patent [19]

Guglielmo et al.

[11] Patent Number: 4,752,988
[45] Date of Patent: Jun. 28, 1988

[54] PROCESS FOR EXTRACTING CRAB MEAT

[76] Inventors: Alfred R. Guglielmo, 650 N. Ardenwood, Baton Rouge, La. 70806; W. Lee Lockerby, P.O. Box 468, Forest City, N.C. 28043

[21] Appl. No.: 838,752

[22] Filed: Mar. 12, 1986
(Under 37 CFR 1.47)

Related U.S. Application Data

[63] Continuation-in-part of Ser. No. 593,035, Mar. 23, 1984, Pat. No. 4,614,006.

[51] Int. Cl.⁴ ............................................. A22C 29/02
[52] U.S. Cl. ........................................... 17/48; 17/71
[58] Field of Search ........................ 17/46, 48, 71, 53

[56] References Cited

U.S. PATENT DOCUMENTS

| | | | |
|---|---|---|---|
| 1,175,037 | 3/1916 | Yancey | 17/71 |
| 1,520,190 | 12/1924 | Lieberman . | |
| 1,565,342 | 12/1925 | Umrath | 17/71 |
| 1,655,583 | 1/1928 | Umrath . | |
| 2,104,027 | 1/1938 | Dubus . | |
| 2,771,631 | 11/1956 | Hiller . | |
| 3,229,325 | 1/1966 | Amelang . | |
| 3,597,792 | 8/1971 | Lockerby . | |
| 3,719,967 | 3/1973 | Craig . | |

Primary Examiner—Willie G. Abercrombie
Attorney, Agent, or Firm—J. C. Kesterson

[57] ABSTRACT

A sanitary process for efficiently extracting crab meat substantially automatically is disclosed. Live crabs are cooked and debacked in a conventional manner. The debacked crab bodies are then prepared for centrifugally extraction of the meat by advancing the individual bodies serially along a processing line by a conveying means. The processing line trims the claws and legs from the crab and then removes the gills and other inedible materials by brushing in a water jet. The clean crab body is then longitudinally sliced into two half sections in a manner that removes the center partition of the crab body and exposes the meat conveying cavities. The individual half sections are then placed in a centrifugal machine which restrains the complete half shell by an openwork barrier as the meat is separated from the shell by centrifugal forces. The separated meat passes through the openwork barrier and is collected by individual meat receptacles located radially outward from the openwork barrier.

8 Claims, 6 Drawing Sheets

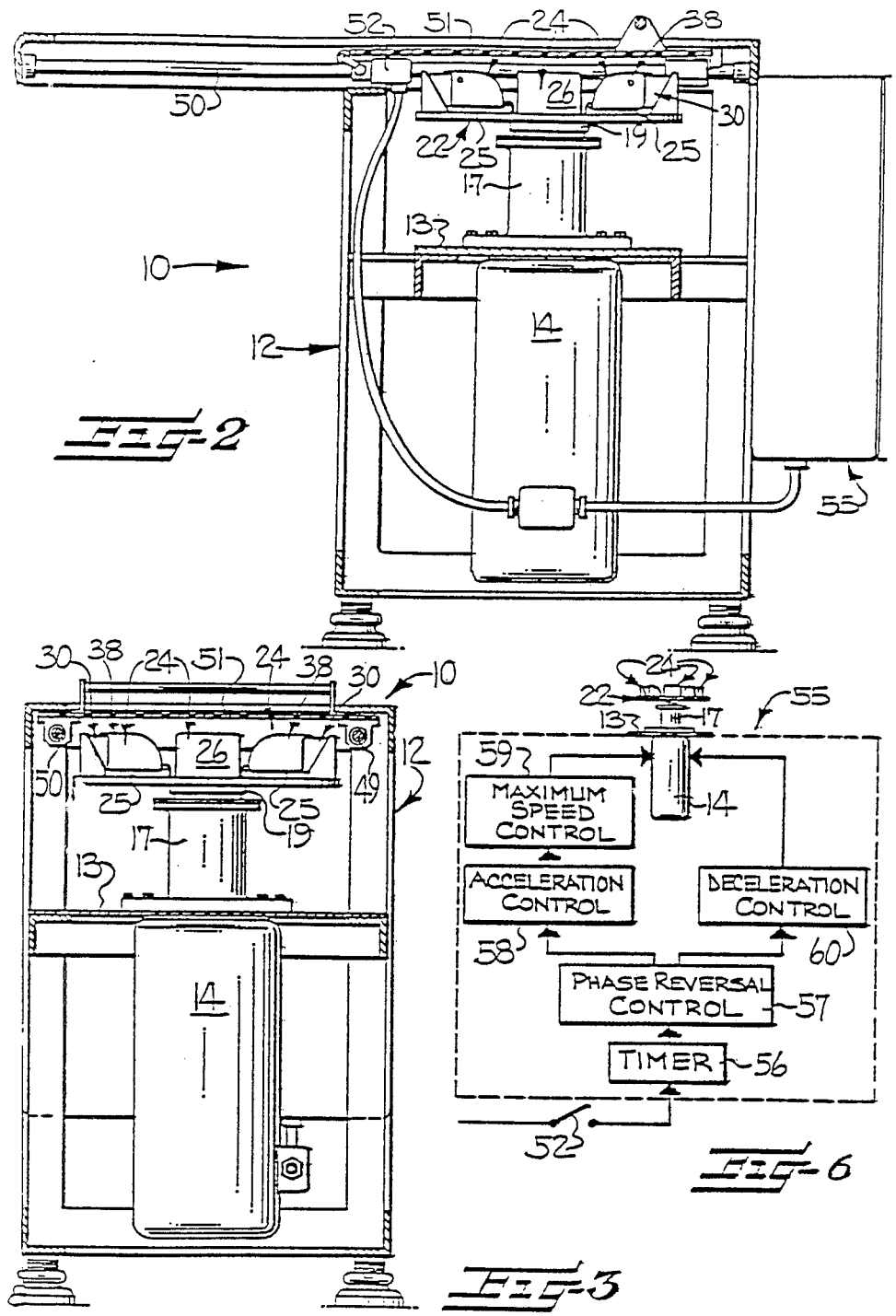

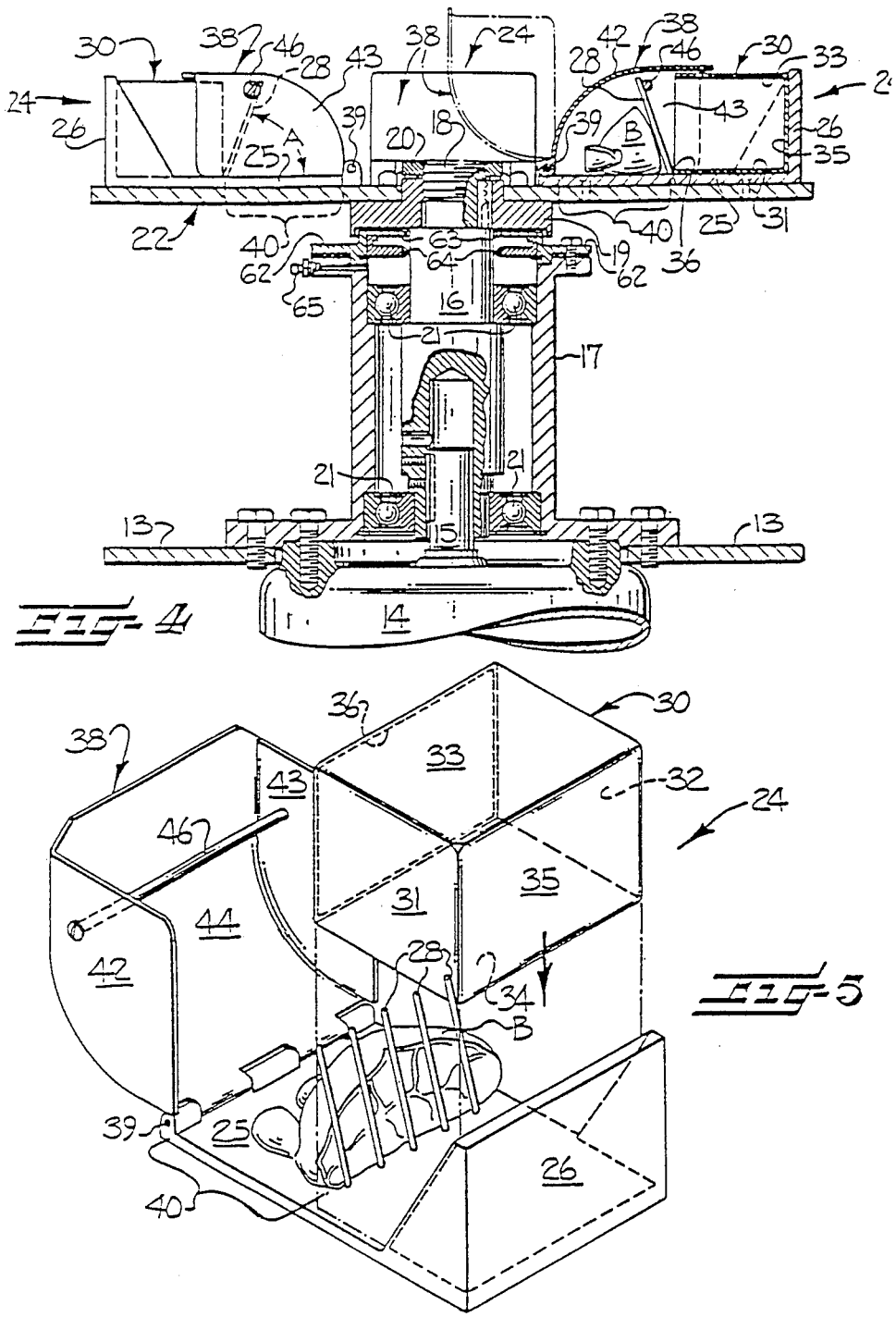

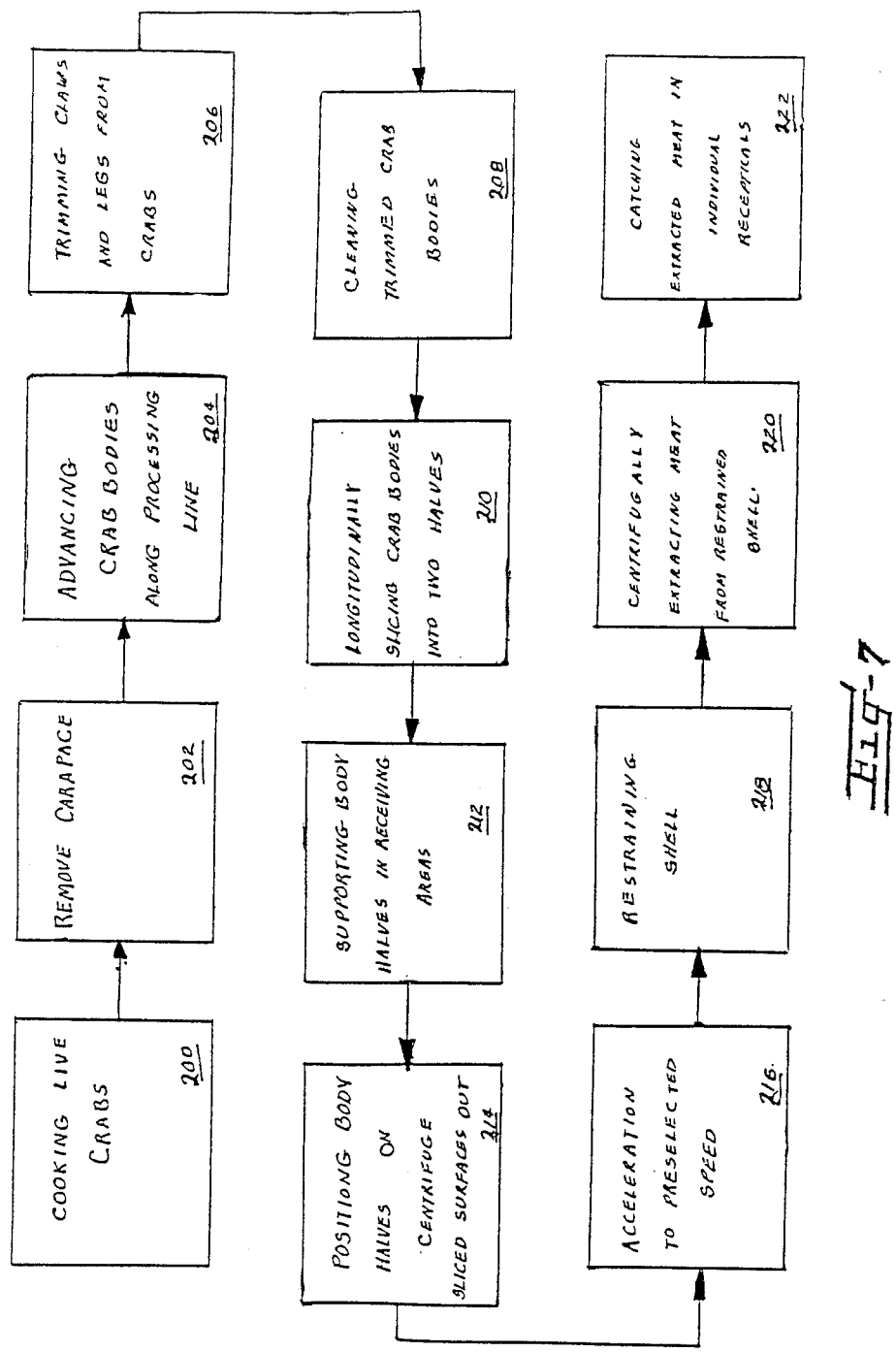

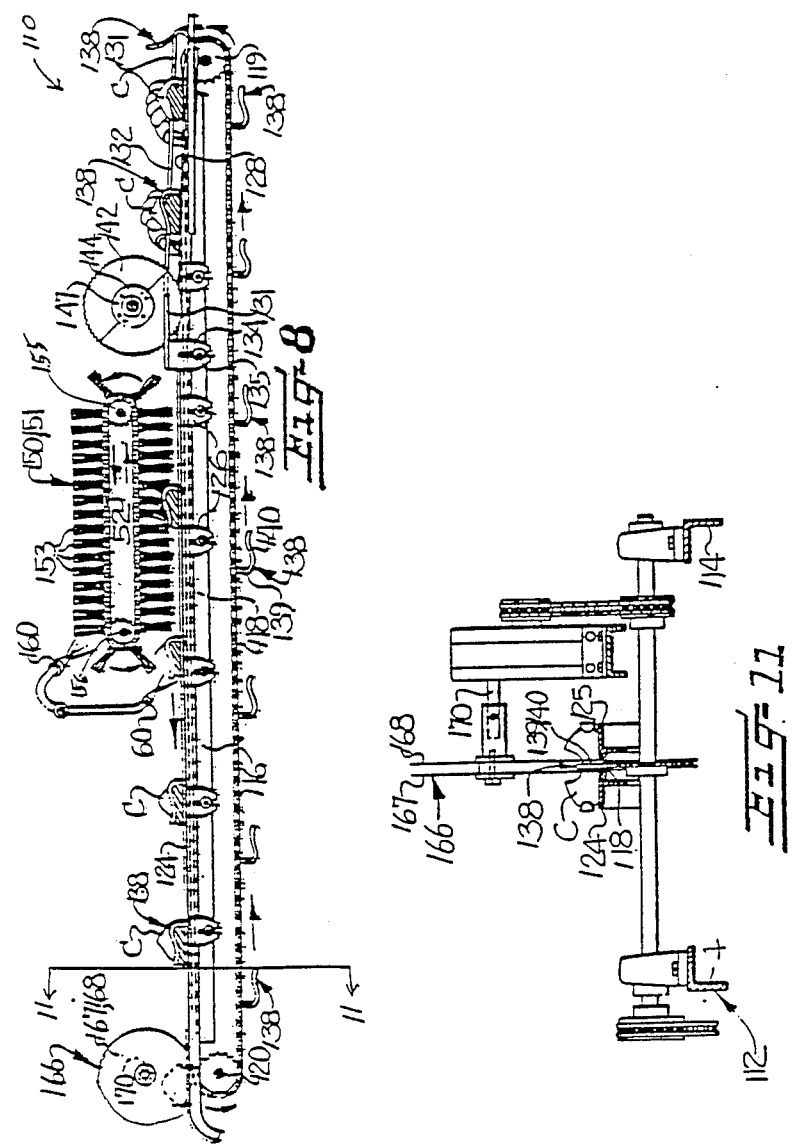

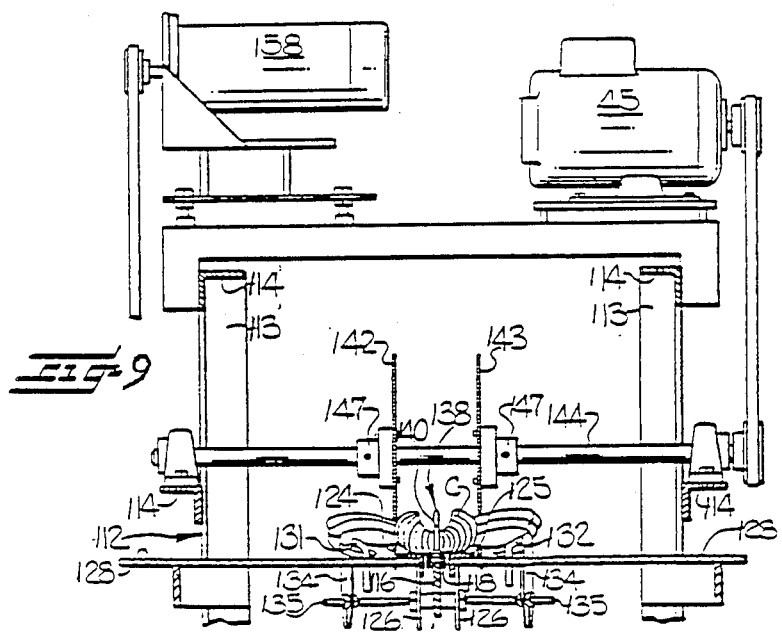
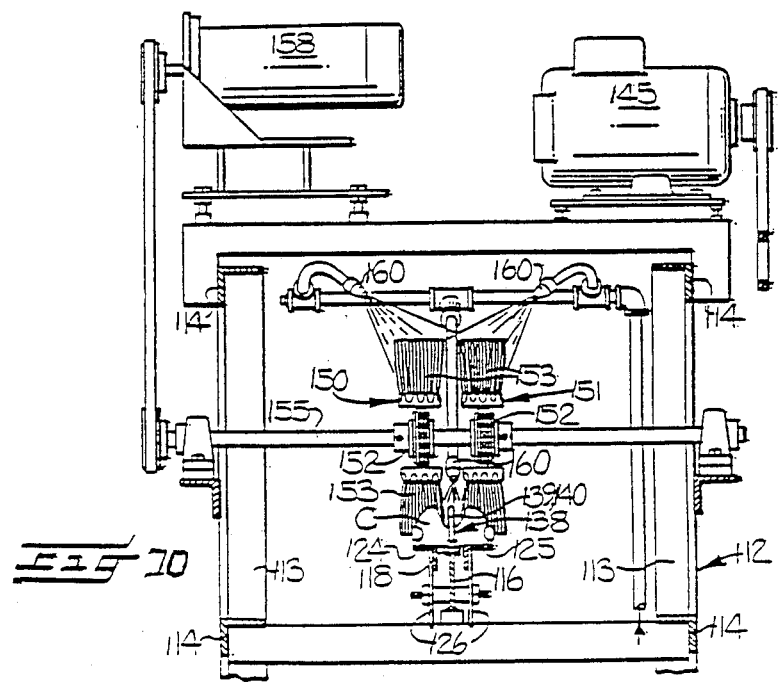

PROCESS FOR EXTRACTING CRAB MEAT

BACKGROUND OF THE INVENTION

This is a continuation-in-part of U.S. application Ser. No. 593,035 filed Mar. 23, 1984, now U.S. Pat. No. 4,614,006, by the same applicants as the present invention.

The present invention relates to a process for initially preparing and centrifugally removing meat from sliced body sections of crabs.

U.S. Pat. No. 4,503,586 issued Mar. 12, 1985 to the same inventors as the present application discloses a method and apparatus for efficiently slicing crab bodies so that the meat therein may be more easily removed. More particularly, the crabs are initially cooked and the back shells are removed. The resulting bodies are then serially advanced along the processing apparatus which sequentially trims the claws and legs, cleans the bodies to remove the gills or other inedible material, and then slices the bodies longitudinally to form two half sections. The longitudinal slicing involves cutting longitudinally through the center portion of the crab bodies on opposite sides of the central body partition thereof so as to remove the partition and open the half sections to their meat containing cavities.

The apparatus of the copending patent application Ser. No. 593,035 of which the present invention is a continuation-in-part is adapted to further process the crab body sections prepared by the apparatus of U.S. Pat. No. 4,503,586, by centrifugally removing the meat from the sections by the use of individual holders which restrain the shell of the crab body half sections by openwork barrier means and collects the meat in open top removable receptacles which spin with the crabs.

Therefore, it is object of the present invention to provide a process for the extraction of crab meat from crabs.

It is another object of the present invention to provide a process for extracting crab meat with minimal handling by human operators.

It is still another object of the present invention to provide a sanitary and effective method of extracting crab meat.

SUMMARY

These and other objects and advantages of the present invention are achieved by the present process for extracting crab meat which comprises the steps of cooking live crabs by conventional methods such as boiling or steaming until done. The carapace or hard back shell is then removed from each of the cooked crabs to obtain backless crab bodies. These backless crab bodies are then placed on a conveyor belt to serially advance the bodies along a predetermined path through a series of processing stations. The crab bodies are advanced along the predetermined path by engaging each of the bodies along its longitudinal center cavity in a manner such that the longitudinal center line of each crab is aligned with the direction of belt or conveyor travel. The advancing crab then moves to a first station which trims the claws and legs off of the moving crab body at substantially the point where the legs and claws join the body. The advancing crab body is then cleaned by brushing and a water jet to remove the gills and other inedible materials. This cleaning is accomplished to the crab body being sliced longitudinally into two half sections which removes the center partition of the crab body and opens the meat containing cavities. Each of the half sections are then supported at a plurality of body receiving areas on a disc adapted for spinning and centrifugally removing the crab meat. The supported crab body half sections are positioned proximate an openwork barrier means (which is located radially outward from the body receiving area) such that the sliced surfaces of the body sections face radially outward. The disc and consequently the crab bodies are then accelerated to a predetermined rotational speed so as to apply centrifugal forces to the crab body half sections. The openwork barrier means restrains the shell of the crab body half sections such that the meat is separated from the crab shell by the centrifugal forces. The separated meat then passes through the openwork barrier means and is collected by a plurality of cup-like receptacles located radially outward from the open work barrier means. In a preferred embodiment, the individual cup-like receptacles are releasably supported by the disc and each has an open top which faces radially inward so as to allow catching of the crab meat.

BRIEF DESCRIPTION OF THE DRAWINGS

Some of the objects having been stated, other objects and advantages of the invention will appear as the description proceeds, when taken in connection with the accompanying drawings in which:

FIG. 2 is a sectional side elevation view of the apparatus shown in FIG. 1 together with an electrical control box mounted at one end of the apparatus;

FIG. 3 is a sectional and elevation view of the apparatus shown in FIG. 1;

FIG. 4 is a sectional side elevation view of the mounting arrangement for the disc of the apparatus shown in FIG. 1;

FIG. 5 is an enlarged exploded perspective view of one of the crab body holders of the apparatus shown in FIG. 1;

FIG. 6 is a schematic representation of the drive control of the electric motor of the apparatus;

FIG. 7 is a block diagram showing the processing steps of the present invention;

FIG. 8 is a fragmentary side elevation view of trimming, cleaning and slicing apparatus;

FIG. 9 is a sectional view of the apparatus of FIG. 8 taken along the line 9—9 and showing details of the leg and claw trimming apparatus;

FIG. 10 is a sectional view of the apparatus of FIG. 8 taken along the line 10—10 and showing details of the brushing and cleaning apparatus; and FIG. 11 is a sectional view of the apparatus of FIG. 8 taken along the line 11—11 and showing the body slicing apparatus.

DESCRIPTION OF THE PREFERRED EMBODIMENT

Figure 1:
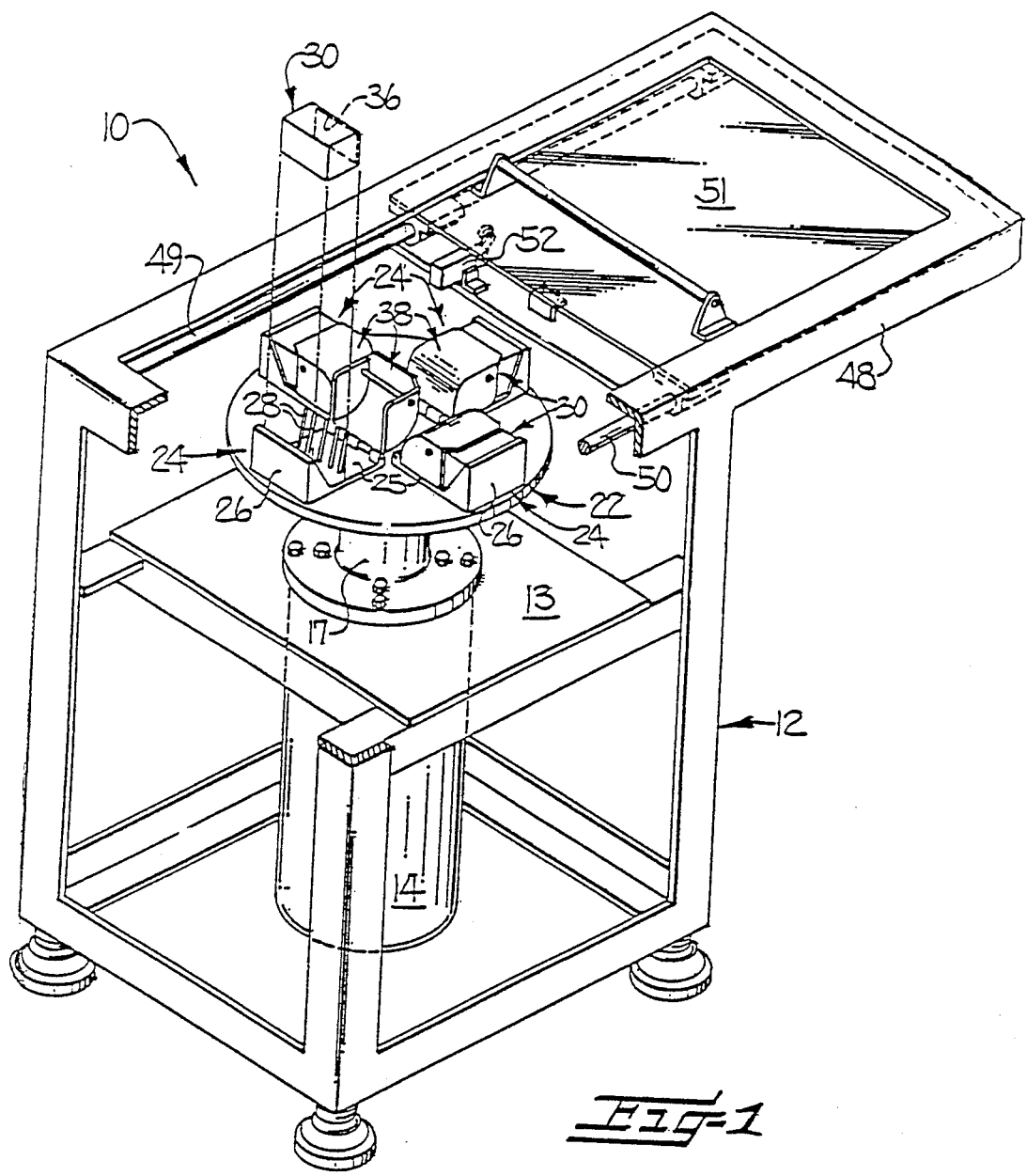
FIG. 1 is a partially sectioned perspective view of an apparatus embodying the features of the present invention.

Referring now to FIG. 7, there are shown the processing steps of the present invention in block diagram format. As shown by block 200, crabs are cooked in a conventional manner such as boiling or steaming under pressure at about 15 psig. The main back shell or carapace shell is then removed as shown in block 202. As will be appreciated in the art, removal of the carapaca shell also results in a substantial amount of fat, part of the intestinal and other non-edible portions of the crab to be removed. However, a substantial amount of inedible material remain including the gills, portion of the intestinal tract and reproductive tract, etc.

As shown in block 204, the debacked crab bodies are then positioned on a conveying means with the longitudinal center line of the crab body aligned along the direction of travel. The conveying means carries the crab body along to a claw and leg trimming station 206 which in the preferred embodiment comprises a pair of saw blades which simply cut through the legs and claws substantially at the point that they join the crab body. The trimmed crab bodies are then conveyed to a cleaning station 208 which is a preferred embodiment removes the gills and their remaining inedible parts of the crab by moving brushes and a jet of water. The clean crab body is then divided at station 210 longitudinally into two sections by a pair of closely spaced parallel slicing blades which removes a small longitudinal center section of the crab and thereby opens up small meat cavities in the crab.

Each half section of a crab body is then placed in one of a plurality of crab body receiving areas on top of a horizontal and rotatably mounted disc in a selected orientation as indicated by blocks 212 and 214. The crab body receiving areas include openwork barrier means located radially outward from the receiving areas such that the crab body is restrained against centrifugal forces. The crab body half is positioned such that the sliced surface of the body half faces radially outward and rest against the openwork barrier means. Upon acceleration of the rotatable disc, and consequently the crab body half sections, the crab body half section shells, which are in one-piece, are restrained by the openwork barrier means. However, the meat is separated from the shells by the centrifugal forces and passes through the open work barrier means where it is caught by receptacles located radially outward from the barrier means as indicated by blocks 216, 218, 220 and 222 of FIG. 7.

Referring more particularly to FIGS. 8, 9, 10 and 11, there is illustrated apparatus suitable for carrying out the processing steps of the present invention subsequent to the cooking and debacking steps. As is better shown in the fragmentary view of FIG. 7, the apparatus 110 includes a central support bar 116 which is self supported by a frame 112 and interconnecting upright 113 and horizontally members 114. The central support bar 116 extends horizontally along a substantially portion of the longitudinal length of the apparatus 114, with the support bar defining a path of travel for the crab bodies C which are advanced through the apparatus as hereinafter further described.

The frame also supports a conveyor means for serially advancing the crab bodies C along the path of travel and which includes an endless conveyor in the form of a chain 118 which is operatively disposed about the sprockets 119, 120. A variable speed electric motor (not shown) is mounted on the frame and is operatively connected to the sprocket 120 for advancing the conveyor chain at a controlled speed. The sprockets are rotatably mounted so that the upper run of the conveyor chain slides along and is supported by the upper edge of the support bar 116.

A pair of parallel, laterally spaced apart support rails 124, 125 are adjustably secured to the bar 116, and so that the upper edge of the bar and the chain 118 extend between the rails. More particularly, the rails 124, 125 are adjustably secured to the bar by means of the slotted brackets 126, so that the elevation of the rails may be adjusted with respect to the bar at several points along the longitudinal length of the apparatus.

The upstream end of the frame mounts a horizontal table 128 includes a slot for receiving the conveyor chain 118. Also a pair of guide rods 131, 132 are disposed along the upstream end portion of the rails, with the upstream ends of the rods being fixed to the table 128 on opposite sides of the slot and the downstream ends of the rods being adjustably fixed to the bar by means of a slotted bracket 134 and threaded member 135. By this arrangement, the elevation of the rods 131, 132 may be adjusted with respect to the bar 116, and the lateral separation of the downstream ends of the rods may also be adjusted.

The crab advancing means of the illustrated apparatus 114 further includes a plurality of retainers 138 mounted in equally spaced relation along the length of the chain 118. Each retainer 138 includes an upright arm 139 having one end fixed to a link of the chain 118, and an integral elongate forwardly directed arm 140 which is generally parallel to and spaced from the chain.

Claw and leg trimming means is disposed along the path of travel, and comprises a pair of rotary driven, laterally spaced apart circular saws 142, 143. The saws 142, 143 are fixedly mounted on a common shaft 144 which extends transversely across the path of travel, and the shaft and saws are rotated by an electric motor 145 which is mounted on the frame 112. Also, in the preferred embodiment, the saws 142, 143 each comprise a pair of semi-circular blade segments which are releaseably attached to the hubs 147, so that the saws may be disassembled for repair or replacement without removing the shaft 144. The hubs 147 are preferably releaseably secured to the shaft 144, so as to permit the lateral separation of the saws to be varied so as to accommodate differently sized crab species.

Immediately downstream of the saws 142, 143 there is provided a pair of laterally spaced apart brush assemblies 150, 151 for removing the gills or other inedible materials from the crab bodies. In the illustrated embodiment, the brush assemblies 150, 151 are disposed on respective opposite sides of the path of travel, and so that each brush assembly is adapted to engage one side of the advancing crabs. In addition, each brush assembly comprises an endless belt 152 mounted to define upper and lower runs, and a plurality of brushes 153 are mounted on each of the belts so as to extend downwardly therefrom on the lower run toward the rails 124, 125. The belts 152 are mounted between sprockets fixed to the shafts 155, 156, and an electric motor 158 is connected to the front drive shaft 155 for advancing the assemblies in unison, with the lower run moving in a direction opposite to the direction of movement of the upper run of the chain 118.

The speed of the motor 158 is preferably adjustable so that the speed of the belts 152 can be varied for the particular crab species being processed. In this regard, the speed of the belts 152 will be correlated with the stiffness of the brushes 153 and the speed of the conveyor chain 118 so as to provide optimum removal of the gills with minimal damage to the crab bodies. The fact that the lower runs of the belts 152 move across the crab bodies in a linear direction, as opposed to purely rotary movement, is also significant, since such linear movement provides effective gill removal at a slower relative speed to thereby further minimize damage to the bodies.

The crab cleaning means further includes a number of water jets 160 for directing a jet of water onto each brush assembly to clean the brushes and thereby facilitate the removal of the inedible materials from the advancing crabs.

The apparatus 110 further includes a slicer 166 disposed along the path of travel downstream of the cleaning means for cutting the crab bodies C longitudinally into two half sections. The slicer 166 includes a pair of rotary driven, closely spaced apart circular blades 167, 168, which are mounted on the shaft 170 immediately above the chain 118. The separation of the blades 167, 168 is designed so that the arms 140 of the retainers pass therebetween, and such that the blades cut through the center portions of the crabs on opposite sides of the central body partition thereof.

The method of operating the above described apparatus will now be described. As best seen in Figures the crab bodies C are normally delivered to the apparatus 110 after having been cooked and the back shells removed by hand or other conventional means. The crab bodies C are then serially placed on the table at the upstream end of the rods 131, 132 by the machine operator, and the claws and legs are spread and draped over and around the rods. As the chain 118 advances, a retainer 138 will move around the sprocket 119 so that the forwardly directed arm 140 closes onto each crab body along a line extending longitudinally through the central visceral cavity of the body. This movement of the arm into the central cavity tends to automatically align the axis of the crab body with the longitudinal direction of the bar and thus the path of travel. In this regard, it will be noted that the retainer does not initially clampingly engage the crab body, and thus the body is free to shift and self align itself with the longitudinal direction of the apparatus. The retainer then advances the body toward the trimming saws 142, 143, with the rods 131, 132 engaging and spreading the claws and legs.

As shown, the rails 124, 125 are preferably suitably adjusted in elevation so that the rails are slightly inclined with respect to the chain 118 and retainers 138 and such that each retainer clampingly presses the crab body downwardly into firm contact with the rails as the body approaches the trimming saws. Thus as the body advances through the saws, it is firmly held by the retainer in the desired orientation, so that the claws and legs are severed along a line closely adjacent the sides of the body.

The crab body C next advances through the cleaning brush assemblies 150, 151, with each brush assembly sweeping along one side of the body in a direction opposite its direction of advance. The brushes serve to remove the gills and other undesired materials, for suitable disposal.

The crab body, which remains clampingly pressed between the retainer 138 handrails 124, 125 is next advanced through the slicer 166, where the body is cut into two half sections. More particularly, the two closely spaced blades 167, 168 of the slicer are designed to closely receive the arm 140 of the retainer therebetween, and such that the blades cut longitudinally through the center portion of the crab body on opposite slides of the central body partition thereof, and so as to remove the partition and thereby expose the meat containing compartments.

As will be apparent from the above description, the various components of the apparatus 110 are adjustable to accommodate different crab species, which vary considerably in size. In particular, the lateral separation of the rods 131, 132 are each adjustable. Also, the elevation of the rails 124, 125 is adjustable with respect to the chain and retainers at several points along the length of the apparatus to permit adjustment of the clamping pressure between the retainer and rails. Still further, the various running components of the apparatus are individually driven, to permit separate adjustment of their speed of operation for maximum effectiveness.

Now referring more particularly to FIGS. 1 through 6, there is shown apparatus generally at 10 which embodies the features of the centrifugal extraction process. The apparatus comprises a supporting, box-like frame 12, which includes a horizontal mounting plate 13. An electric direct current motor 14 is mounted to the plate 13, with the output shaft 15 of the motor extending vertically through the plate 13 in the manner best seen in FIG. 4. The output shaft 15 is fixed to an intermediate shaft 16 which is rotatably mounted in the housing 17 by means of the bearings 21, and the upper end 18 of the intermediate shaft is threaded. A transverse flange 19 is threadedly received on the upper threaded end 18, and a lock nut 20 is provided for releasably locking the flange 19 to the shaft 16.

The apparatus 10 further includes a horizontally disposed disc 22 which is bolted to the flange 19, and so that the rotation of the motor 14 is transmitted to the disc 22. The disc 22 comprises a circular metal plate, having a diameter which typically measures about 18 inches. A total of four separate holders 24 are fixedly mounted to the disc in an equally spaced apart arrangement about the periphery of the disc. Each of the holders 24 includes a bottom plate 25 which is bolted to the disc 22, and an upright support wall 26 disposed at the radially outer edge of the holder, with the wall 26 extending in a direction perpendicular to a radial line on the disc. An inwardly extending side edge wall 27 is mounted at each end of the support wall 26.

Each of the holders further includes openwork barrier means in the form of a plurality of upright pins 28 which are mounted to the plate 25 in spaced relation along a row disposed perpendicular to a radial line on the disc, with the row of pins 28 being located radially inwardly from the upright support wall 26. As best seen in FIG. 4, the upright pins 28 are inclined from the vertical in a direction toward the rotational axis of the disc, and so as to form an acuate angle A with the portion of the bottom plate 25 inside of the pins. Typically, the angle A measures between about 60° to 80°.

The apparatus further includes a plurality of individual cup-like receptacles 30 having a rectangular box-like configuration. More particularly, each receptacle includes parallel opposite end walls 31, 32 and parallel opposite side walls 33, 34, a closed bottom 35, and an open top 36. Further, each receptacle 30 is sized so that it may be closely received in an operative position between the upright support wall 26 and the pins 28, and between the side edge walls 27 with the open top 36 facing radially inwardly and toward the pins. Further, and as best seen in FIG. 5, the receptacle 30 may be vertically lifted and separately removed from its operative position.

Each holder 24 further comprises a cover 38 which is pivotally mounted to the bottom plate 25, and thus the disc 22, by means of a hinge 39 having an axis which is located radially inwardly from the row of pins 28 a predetermined distance, with the axis of the hinge 39 extending generally parallel to the direction of the row of pins. Thus a crab body receiving area 40 is defined between the row of pins 28 and the axis of the hinge 39.

The cover 38 comprises parallel opposite end walls 42, 43 and a curved top wall 44 which extends between the end walls, and the cover is pivotable between an open or raised position shown in FIG. 5 wherein the body receiving area 40 is open to permit a crab body B or the like to be vertically received therein, and a closed or lowered position as seen in FIG. 4 wherein the cover substantially overlies and encloses the body receiving area. In addition, the end walls 42, 43 and curved top wall 44 of the cover are sized and configured so as to enclose the end walls 31, 32 and upper side wall 33 of the associated receptacle 30 when the receptacle is disposed in its operative position, and the cover is closed. Thus in the closed position of the cover, it will be seen that the crab body B in the area 40 is entirely enclosed, to thereby protect the body from wind forces during rotation of the disc and which would tend to deflect the body from its alignment with the row of pins. It will also be seen that the cover will be held in the closed position by centrifugal force when the disc is rotated, and the end walls 42, 43 will tightly contact the bottom plate 25 to form a tight seal.

Each cover 38 further includes a rod 46 extending between the end walls 42, 43 thereof, with the rod 46 being located so as to be disposed immediately adjacent the radially back side of the row of pins 28, and adjacent the upper ends thereof when the cover is disposed in the closed position, and so that the rod 46 reinforces the pins against the centrifugal forces exerted by the crab bodies or the like during rotation of the disc. In view of the high rotational speed achieved by the disc and holders as further described below, it is preferred that the disc and holders be dynamically balanced to assure vibration-free operation.

The supporting frame 12 of the apparatus will be seen to substantially enclose the motor 14 and disc 22, and it will be understood that the upper portion of the frame preferably includes covering side panels (not shown) which are provided for safety purposes. In addition, the supporting frame 12 includes a lateral extension 48 at the upper portion thereof, with the extension mounting a pair of rods 49, 50 for slideably supporting a protective cover 51 of non-breakable glass or other suitable material. A switch 52 is mounted to the frame 12 which only when the cover 51 is moved to the operative position immediately above the disc as shown in FIG. 2, and as further described below.

The apparatus 10 of the present invention further comprises drive means mounted on the support frame for rapidly accelerating the disc to a predetermined rotational speed so as to be adapted to centrifugally extract meat from the sliced crab bodies B or the like which are positioned in the holders 24 in contact with the radially inner side of the row of pins 28, and with the extracted meat passing through the row of pins and into the receptacles 30. This drive means includes the direct current motor 14 as described above, and a motor control 55 as schematically illustrated in FIG. 6. More particularly, the motor control includes an adjustable timer 56, and a phase reversal relay 57 which is actuated when the timer times out to reverse the polarity of the motor 14 and cause the motor to convert to its regenerative mode to electrically brake the disc 22 to a stop. The motor control also includes an acceleration control 58, an adjustable maximum speed control 59, and a deceleration control 60.

The motor 14 should have sufficient power to rapidly accelerate the disc 22 to its selected maximum speed, which typically is about 1750 to 2000 rpm, and then electrically brake the disc to a stop at an equally rapid deceleration rate. In this regard, it is believed that the acceleration of the disc is often times more critical than the final speed in removing the meat, since a rapid acceleration is able to "jerk" the meat from the several compartments in the crab body, and thus acceleration is able to remove a great deal of meat which cannot be removed by centifugal force alone. For this reason, the acceleration control 58 is set at a maximum acceleration rate, but which is not so high as to cause the shells of the species of crabs being processed to break. For example, Dungeness crabs which are indigenous to the West coast have a relatively pliable shell, and can withstand a relatively high acceleration rate without breakage, whereas the Blue crabs which are found on the East coast have a relatively brittle shell which tends to break at higher acceleration rates.

The acceleration control 58 and the deceleration control 60 are of conventional design, and the acceleration control 58 permits the time of acceleration to the predetermined maximum speed to be varied, and the deceleration control permits the time of deceleration from the maximum speed to a stopped condition to be varied. As will be understood, a rapid deceleration is desirable to shorten the overall cycle time and thus permit increased production. A suitable regenerative direct current motor control of the described type is manufactured by Seco Electronics of Lancaster, South Carolina.

As best seen in FIG. 4, the mounting of the disc 22 to the shaft 16 is designed to prevent water which may be present on the disc from reaching the bearings 21. In this regard, the upper end of the housing 17 mounts a seal cap 62 which is bolted thereto, and the seal cap 62 includes a radial flange 63 which extends to a point closely adjacent the shaft 16. Also, a lip seal 64 having a resilient inner edge is mounted to the seal cap 62 by a force fit or the like, and the inner edge of the lip seal contacts the shaft 16 so as to prevent the passage of water to the upper bearing 21. The space between the radial flange 63 and the upper bearing 21 is preferably filled with grease by means of the nipple 65, to further resist the passage of water. By this arrangement, it is nearly impossible for any water associated with the crab bodies on the disc to reach the bearings 21.

To now describe the operation of the illustrated embodiment, the apparatus is initially loaded by withdrawing the cover 51 to the position shown in FIG. 1, which acts to open the switch 52 and disconnect the drive motor. The covers 38 of the four holders 24 are then lifted, and one or possibly more crab body sections B are positioned in the receiving area 40 of each holder, with the sliced open side of each body section being disposed against the row of pins 28. The covers 38 are then closed, and the cover 51 is moved to its operative position overlying the disc. Upon the cover 51 reaching its operative position, the switch 52 closes, which activates a cycle of operation for the apparatus.

Specifically, upon closure of the switch 52, the motor accelerates at the rate established by the acceleration control 58, to the selected speed. As described above, the selected acceleration and final rotational speed are determined to achieve most efficient meat removal, without shell breakage, for the particular species being processed. For most crab species, it is desirable that the disc be accelerated at a rate of at least about eight revolutions per second per second, for a period of two to four seconds, which will result in the meat being essentially entirely extracted. In the case of crab species having stronger shells, it is preferred that the disc be accelerated at a higher rate, such as about 16 revolutions per second per second, for between about two to four seconds.

As a specific example, the apparatus may include a direct current motor 14 having a 7½ horsepower rating, and the disc 22 may measure 18 inches in diameter, with the row of pins being spaced about 5½ inches from the rotational axis of the disc. Assuming Dungeness crabs are being processed, the maximum rotational speed may be set to about 1800 rpm (i.e. 30 rev/sec), and the acceleration rate set at about two seconds (i.e. 15 re/sec/sec), with the deceleration rate being set at the same time period. The timer 56 is set at about two seconds, so that the relay 57 reverses the motor polarity to commence deceleration immediately upon the motor reaching its maximum speed. Thus in operation, the disc may be accelerated to its predetermined maximum speed, and braked to a full stop, in about four seconds.

The acceleration and centrifugal forces act to press the crab bodies B against the row of pins 28, with the extracted meat moving through the row of pins and into the receptacles 30. In this regard, the angled orientation of pins 28 serves to wedge the bodies between the pins and the bottom plate 25, to further hold the bodies in proper alignment during the cycle of operation.

Upon completion of the cycle of operation, the cover 51 is withdrawn to the position shown in FIG. 1, and the covers 38 are pivoted upwardly to permit removal of the empty shells. Usually, several cycles may be run before the receptacles 30 become full, at which time they are removed and replaced with empty receptacles. The body receiving areas 40 are then again loaded with crab body sections, and the process is repeated.

In the drawings and specification there has been set forth a preferred embodiment of the invention, and although specific terms are employed, they are used in a generic descriptive sense only and not for purposes of limitation.

We claim:

1. A process for the extraction of crab meat from hard shelled crabs comprising the steps of:
    cooking live crabs until done;
    removing the carapace or back shell from each of said crabs to obtain backless crab bodies;
    serially advancing each backless crab body along a predetermined path of travel by engaging each crab body along its longitudinal center cavity such that the longitudinal centerline of each crab is aligned with the direction of movement;
    trimming the claws and legs off of the advancing crab body;
    cleaning the advancing crab bodies to remove gills and other inedible materials therefrom;
    slicing the cleaned crab bodies longitudinally into two half sections;
    supporting each of said crab body half sections at a plurality of body receiving areas equally spaced about the periphery of a rotatable mounted and horizontally disposed disc;
    positioning said half sections proximate open work barrier means located radially outward from said body receiving area with the sliced surfaces of said half sections facing radially outward;
    accelerating said disc and said supported body half sections to a predetermined rotational speed;
    restraining the shell of said spinning crab body half section by said open work barrier means;
    centrifugally extracting meat from said restrained shell, said extracted meat separating from said shell and passing through said open work barrier means; and
    catching said extracting meat in a plurality of cup-like receptacles located radially outward from said open work barrier means and releasably supported by said disc, each receptacle having an open top facing radially inward.

2. The process of claim 1 comprising the further step of engaging and spreading the claws and legs of the advancing crab bodies immediate prior to and during the trimming step.

3. The process of claim 1 wherein the cleaning step includes engaging the advancing crab bodies with a moving brush assembly and directing a jet of water into the brush assembly to facilitate cleaning of the brush assembly.

4. The process of claim 1 wherein the slicing step includes cutting longitudinally through the center position of the crab bodies on opposite sides of the central body partition thereof so as to remove such partition and open the half sections to their meat containing cavities.

5. The process of claim 1 wherein the advancing step includes initially loosely engaging each crab body along a line extending longitudinally through the central cavity to permit the self-alignment of the crab body with said longitudinal line parallel to the direction of travel and thereafter clampingly pressing the crab body against a support surface.

6. The process of claim 1 comprising the further step of selectively enclosing the body receiving area by a cover pivotable between an open position wherein said body receiving area is open to permit a sliced crab body to be received therein and in a closed position for spinning.

7. The process of claim 1 and further comprising the step of inclining said open work barrier means from the vertical in a direction toward the rotational axis of said disc.

8. The process of claim 1 and comprising the further step of braking and stopping said accelerating disc.

* * * * *